Figure 1:
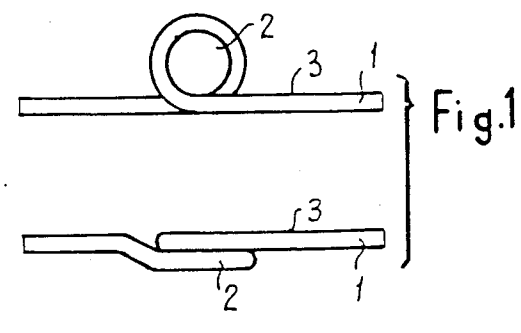

United States Patent [19]

James

[11] Patent Number: 4,717,902
[45] Date of Patent: Jan. 5, 1988

[54] ELECTRICAL COMPONENTS INCORPORATING A TEMPERATURE RESPONSIVE DEVICE

[75] Inventor: Kenneth S. James, Frome, Great Britain

[73] Assignee: Dubilier PLC, Abingdon, Great Britain

[21] Appl. No.: 878,888
[22] PCT Filed: Oct. 21, 1985
[86] PCT No.: PCT/GB85/00485
§ 371 Date: Jul. 16, 1986
§ 102(e) Date: Jul. 16, 1986
[87] PCT Pub. No.: WO86/02773
PCT Pub. Date: May 9, 1986

[30] Foreign Application Priority Data

Oct. 24, 1984 [GB] United Kingdom ................ 8426904

[51] Int. Cl.⁴ ...................... H01H 39/00; H02H 7/24
[52] U.S. Cl. ..................................... 337/32; 337/415; 361/124
[58] Field of Search ............. 361/124; 337/32, 28-31, 337/33, 24, 401-404, 415

[56] References Cited

U.S. PATENT DOCUMENTS 2,992,310  7/1961  Babany ................................. 337/415
3,046,536  7/1962  Sciuto .................................. 340/277
4,212,047  7/1980  Napiorkowski ..................... 361/124
4,371,911  2/1983  Baker .................................. 361/124

FOREIGN PATENT DOCUMENTS 676466   6/1966  Belgium .
309057   8/1955  Switzerland .
2018028  10/1979  United Kingdom .

Primary Examiner—Harold Broome
Attorney, Agent, or Firm—Biebel, French & Nauman

[57] ABSTRACT

An electrical component comprising a temperature responsive device including an electrically conducting member (1) of spring temper in contact with a thin insulating coating (3) of a substance which decomposes on being subject to an elevated temperature thereby allowing the conducting member (1) to effect a short circuiting operation. Suitably the conducting member (1) is coated with a thin layer of polyurethane varnish which vaporizes at the elevated temperature, and the conducting member (1) is arranged to engage contacts (5,5) under spring tension. In one embodiment the conducting member (1) is a wire of phosphor bronze or beryllium copper formed as a loop (2) with spring arms, the loop (2) being positioned on a pin 4 centrally disposed between spaced contacts (5) engaged by the arms under spring tension.

9 Claims, 5 Drawing Figures

ELECTRICAL COMPONENTS INCORPORATING A TEMPERATURE RESPONSIVE DEVICE

The present invention relates to electrical components incorporating a temperature responsive device and more particularly to such components in which the temperature responsive device is provided to perform a protective function on the component or on an associated component.

Electrical components incorporating temperature responsive devices of various forms are known. Thus, the temperature responsive device may take the form of a bimetallic member which, when heated, is subjected to distortion which in turn can be employed to perform an open-circuiting or short-circuiting function. However such devices are relatively expensive and require careful adjustment.

Another form of temperature responsive device comprises a resilient electrically conductive member which is normally maintained in a stressed condition by means including a heat softenable material, the arrangement being such that when the heat softenable material becomes soft at an elevated temperature, the stress in the resilient electrically conductive member is released to enable it to perform a short-circuiting or open-circuiting function. In such devices the heat softenable material may be a metallic fusible material, for example a relatively low melting point alloy, or a fusible insulating material such as a thermoplastics material which becomes soft at a desired temperature.

Also, where the device employs a fusible insulating material which normally holds the stressed resilient electrically conductive member out of engagement with a cooperating contact, although the heat softening of the insulating material allows the resilient electrically conductive member to engage the contact, there is always the possibility that a film of the softened insulating material remains interposed between the engaging parts thereby preventing the protective short-circuiting function from occuring.

It is an object of the present invention to provide an improved form of temperature responsive device for electrical components.

From one aspect the invention provides an electrical component comprising a temperature responsive device including an electrically conducting member of spring temper in contact with a thin insulating coating of a substance which decomposes on being subjected to an elevated temperature.

From another aspect the invention provides an electrical component having at least two electrodes or regions which become short-circuited when a temperature responsive device associated with the component responds to an increase in temperature and wherein the temperature responsive device comprises an electrically conducting member of spring temper in contact with a thin insulating coating of a substance which decomposes on being subjected to an elevated temperature to thereby effect the short-circuiting operation.

In one embodiment the temperature responsive device comprises a wire or strip of spring temper, for example of phosphor bronze or beryllium copper which is coated with a thin coating of a polyurethane varnish which decomposes at an elvated temperature.

According to a feature of the invention, the thin coating of thermally decomposable varnish is of a thickness not exceeding a few tens of microns.

If desired the thermally decomposable coating may consist of an initial coating of a polyurethane varnish and a subsequent coating of nylon, the overall thickness of the combined coating not exceeding a few tens of microns.

Preferably the thermally decomposable coating has an overall thickness within the range 15 to 30 microns and is such that it decomposes or vapourises at a temperature within an approximate temperature range of 175° to 300° C.

The invention may particulary be employed as an overheating protection device attached to a component such as an excess voltage arrestor which may take the form of a pair of spaced electrodes defining a spark gap and arranged in a gas filled enclosure. Such arrestors may also take the form of three electrode devices in which case the third electrode is generally located in the region of the spark gap.

Figure 2:
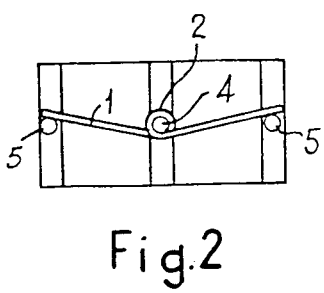
Figure 3:
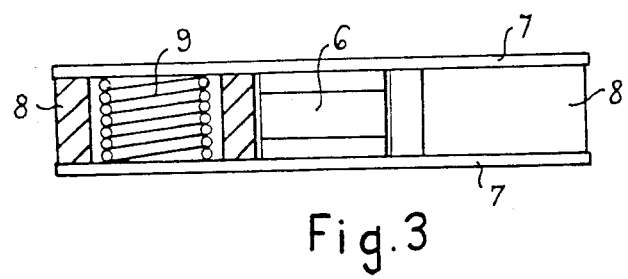
Figures 4, 5:
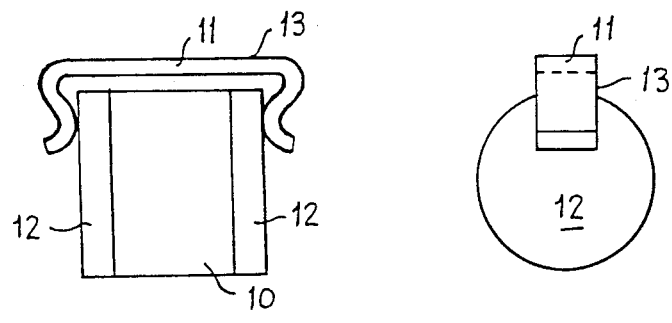

The invention will now be further described, by way of example, with reference to the accompanying drawings, in which:

FIG. 1 shows in plan and elevation one form of temperature responsive device according to the invention, FIG. 2 shows a plan view of an electrical component incorporating the device of FIG. 1, FIG. 3 is a side view of a further embodiment, FIG. 4 is a side view of yet a further embodiment, and FIG. 5 is an end view of the component in FIG. 4.

FIG. 1 shows a simple form of temperature responsive device in which a wire 1 of spring temper, for example a phosphor bronze wire or a beryllium copper wire, is formed into a single loop 2 in order to increase the spring tension and is coated with a micron sized coating 3 of a polyurethane varnish.

FIG. 2 is a plan view of the casing of a three electrode excess voltage arrestor comprising two electrodes defining a spark gap and having terminal pins 5, as well as an intermediate electrode having a terminal pin 4. The arrestor is fitted with a temperature responsive device as shown in FIG. 1, and has the loop 2 fitted over the central pin 4; the ends being retained in a stressed condition by resting on the two outer pins 5.

In this embodiment the wire 1 may have a diameter of 0.376 mm and be of "semi-spring" temper. The coating 3 is of a polyurethane varnish having a thickness in the range 0.017 to 0.020 mm. An outer nylon coating of 0.005 to 0.10 mm thickness may also be applied.

The coating destructs or decomposes at a temperature of the order of 300° C. and in practice then disappears as a whiff of vapour or smoke, thereby allowing the bared wire 1 to make electrical contact between the terminals 4 and 5.

Referring now to the embodiment of FIG. 3, a gas discharge tube 6 is welded between two terminal plates 7, and ceramic spacers 8 are also provided between the plates. One of the spacers encloses a helical spring 9 having a thermally decomposable coating of polyurethane varnish. When the coating decomposes at an elevated temperature, the ends of the spring 9 are exposed to contact the electrodes 7 and perform a shorting function. The dimensions of the spring and of the coating may be similar to those previously described.

FIGS. 4 and 5 show a component 10 having a temperature responsive device 11 in the form of a spring clip connected across the end terminals 12 of the device. Normally the insulating coating 13 of polyurethane varnish on the clip insulates the clip from the end terminals 12, but when this coating decomposes at an elevated temperature the clip 11 acts to short circuit the end terminals. The thickness of the thermally decomposable coating is within the ranges previously set out.

Whilst the invention has been specifically described, in the main, as applied to excess voltage arrestors, it may obviously be applied to any other electrical component in order to protect it from damage due to overheating. For example the component, could be an integrated circuit or microchip. Moreover the temperature responsive device could itself be formed as a separate component which is mounted in the vicinity of and appropriately connected to a component or components which it is to protect from overheating.

According to a further modification, an electrical component may itself be coated with the thermally decomposable coating and the spring temper wire or strip may be left bare, but preferably plated or otherwise treated against corrosion.

Clearly such an arrangement will operate in the same way to produce a short circuiting effect at an elevated temperature by the thermal decomposition of the coating.

I claim:

1. An excess voltage arrestor comprising at least two spaced electrodes defining a spark gap arranged in a gas filled enclosure, and a protective temperature responsive device comprising an electrically conducting member of spring temper and a thin insulating coating of a substance which thermally decomposes on being subject to an elevated temperature, said temperature responsive device being urged by said spring temper into physical contact with said electrodes such that upon thermal decomposition of said insulating coating at an elevated temperature, said electrically conducting member effects a short circuit across said electrodes.

2. An excess voltage arrestor as claimed in claim 1, in which the electrically conducting member of spring temper is of metal alloy chosen from the group comprising phosphor bronze and beryllium copper.

3. An excess voltage arrestor as claimed in claim 1, in which the electrically conducting member is a wire of spring temper.

4. An excess voltage arrestor as claimed in claim 1, in which the thermally decomposable coating is a polyurethane varnish.

5. An excess voltage arrestor as claimed in claim 4, in which the coating is of a thickness not exceeding a few tens of microns.

6. An excess voltage arrestor as claimed in claim 5, in which the coating is of a thickness within the range of 15 to 20 microns and is such that it decomposes within the range of 175° to 300° C.

7. An excess voltage arrestor as claimed in claim 1, in which the protective temperature responsive device comprises a metal wire of spring temper coated with a polyurethane varnish and engaging respective electrodes under spring tension.

8. An excess voltage arrestor as claimed in claim 7, in which an outer coating of nylon is provided on the polyurethane varnish.

9. An excess voltage arrestor as claimed in claim 1, comprising three spaced electrodes and having a metal wire of spring temper coated with a polyurethane varnish in contact with the central one of the three electrodes and also having its opposite ends respectively engaging the other two electrodes.

* * * * *